United States Patent

Kousek et al.

[11] Patent Number: 6,128,326
[45] Date of Patent: Oct. 3, 2000

[54] CONSTRUCTIONAL LASER

[75] Inventors: Heinz Kousek, Feldkirch, Austria; Hans Hüsler, Grabs, Switzerland; Peter Theiss, Böblingen, Germany

[73] Assignee: Hilti Aktiengesellschaft, Schaan, Liechtenstein

[21] Appl. No.: 08/978,776

[22] Filed: Nov. 26, 1997

[30] Foreign Application Priority Data

Nov. 26, 1996 [DE] Germany .......................... 196 48 867

[51] Int. Cl.[7] .................................................. H01S 3/00
[52] U.S. Cl. .............................. 372/109; 356/73; 356/247
[58] Field of Search .............................. 372/109; 33/227; 73/84; 356/139.06, 73, 139.07, 247; 250/206.1, 206.2

[56] References Cited

U.S. PATENT DOCUMENTS

| | | | |
|---|---|---|---|
| 4,333,242 | 6/1982 | Genho, Sr. | 33/227 |
| 5,591,902 | 1/1997 | Castagner | 73/84 |
| 5,742,387 | 4/1998 | Ammann | 356/247 |

*Primary Examiner*—Frank G. Font
*Assistant Examiner*—Delma R. Flores Ruiz
*Attorney, Agent, or Firm*—Brown & Wood, LLP

[57] ABSTRACT

A constructional laser including a housing (3) with a light source located inside the housing for emitting a visible laser beam rotatable about a rotational axis, a base plate (11) attached to the housing (3) and provided with an inner thread (25) approximately in a center of the base plate (11), and two handles (12, 13) for lifting and carrying the laser and connected to the base plate (11) with the two handles (12, 13) being spaced from opposite sides of the housing (3) and extending at a right angle from the base plate (11) parallel to a height of the housing (3) toward an upper surface (4) of the housing (3), with the handles (12, 13) having at sides thereof remote from the housing (3), three servo positioners (14, 15, 16), with two of the servo positioners (14, 15) being provided on one handle (12) and with the third, height-adjustable servo positioner (16) being arranged on another handle (13), the three-point arrangement of the servo positioners (14, 15, 16) defining an isosceles triangle, with the connection lines between the three forming lateral side(s) of the isosceles triangle.

6 Claims, 4 Drawing Sheets

CONSTRUCTIONAL LASER

BACKGROUND OF THE INVENTION

1. Field of the Invention

The present invention relates to a constructional laser including a housing with a light source located inside the housing for emitting a visible laser beam rotatable about a rotational axis, a base plate attached to the housing and provided with an inner thread approximately in a center of the base plate, and two handles for lifting and carrying the laser and connected to the base plate.

2. Description of the Prior Art

Lasers are used in constructional industry, in plumbing and electrical trade and related fields, as an auxiliary means for laying down horizontal or vertical liners on ceilings, walls and floors or for setting horizontal or vertical planes in a space. E.g., they are necessary for the alignment of door cases and windows and for determining an exact horizontal or vertical course of electrical lines. The constructional lasers are also used for the horizontal or vertical arrangement of attachment points.

A constructional laser includes a laser which is located in the housing and emitted beam of which is rotated for producing a line. For setting a plane in a room or a space, two laser beams, which are set to each other at a right angle, are used. The rotation of the laser beams is achieved either by the rotation of the laser or the rotation of a laser beam deflection device. The commercially available laser with a rotatable laser beam permits to obtain a horizontal marking on walls when the base plate of the laser housing is oriented toward the floor. A horizontal arrangement of the laser beam is sufficient for many applications. The exact alignment of the laser beam is effected with adjustment screws provided on the laser housing and which permit to tilt the rotational axis of the laser beam. In order to be able to lay down horizontal markings at a different height, the laser housing can be mounted on a tripod. To this end, the base plate of the laser housing is usually provided with an inner thread into which an attachment screw, which is provided on the tripod, can be screwed in. In order to secure the constructional laser on the tripod, the housing should be lifted with two hands, positioned on the mounting plate of the tripod and secured. Usually, for mounting of a constructional laser, two persons are necessary, with one person taking care of preventing the apparatus from falling down while the other person screws the tripod attachment screw into the base plate. To facilitate carrying of the apparatus, constructional lasers, which have a handle on the upper surface of the laser, are available. The handle permits to lift the laser with one hand. In this way, one person can mount the laser on a tripod. However, providing a handle on the upper surface of the laser housing makes mounting of the laser at a greater height more difficult.

It is often necessary to lay down vertical lines and planes. To this end, a commercially available constructional laser, which is designed for laying down horizontal lines and planes, should be pivoted by 90° relative to its conventionally used position. For a conventional laser of this type, to this end, a separate angular holding device is provided, which is attachable to the housing. The attachment of the holding device is effected by screwing-in of an attachment screw into an inner thread which is provided in the base plate of the housing for attachment of a tripod. The housing then is adjusted on a approximately rectangular support plate which projects from the holding device at a right angle. To mount the laser on a tripod, the holding device should be detached from the base plate to free the attachment inner thread of the base plate so that the tripod attachment screw can be screwed in.

The support plate, which extends at a right angle to the holding device, has three servo positioners located at three corners, providing a three-point support. The fourth corner of the support plate does not have any support. At least one of the servo-positioners is height adjustable for compensating an unevenness of the base surface. In association with the adjusting screws provided on the laser housing for tilting the rotational axis of the laser beam, this provides for vertical alignment of the laser beam. The arrangement of the servo positioners at the corners of the support plate makes the alignment of the constructional laser more difficult, because the height adjustment of the adjustable servo positioner causes tilting of the laser beam rotational axis in two planes. This tilting should again be compensated with adjusting screws provided on the laser housing. This can result in sidewise displacement of the laser beam rotational axis which, in turn, requires new positioning of the housing. Thus, the alignment process should be repeated again.

Accordingly, an object of the present invention is to provide an improved constructional laser of the above-described type which would insure a convenient handling of the apparatus. The modified constructional laser should insure laying down both horizontal lines and planes. The attachment and detachment of the holding devices for different applications should be eliminated. Further, the modified constructional laser should be convenient to carry. The modified constructional laser should require only one person for its mounting on a tripod. The alignment of the laser beam for projection vertical lines and planes in a space or zoom should be simplified.

SUMMARY OF THE INVENTION

These and other objects of the present invention, which will become apparent hereinafter, are achieved by providing a constructional laser which includes a housing with a light source located inside the housing for emitting a visible laser beam rotatable about a rotational axis, a base plate attached to the housing and provided with an inner thread approximately in a center of the base plate, and two handles for lifting and carrying the laser and connected to the base plate, with the two handles being spaced from opposite sides of the housing and extending at a right angle from the base plate parallel to a height of the housing toward an upper surface of the housing, with the handles having at sides thereof remote from the housing, three servo positioners, two of which positioners are provided at opposite longitudinal ends of one of the handles and with a remaining servo positioner, which is height adjustable, being arranged on another one of the handles so that a three-point arrangement of the servo positioners defines an isosceles triangle, with connection lines between the remaining servo positioner, which is arranged on the another one of the handles, and the two servo positioners, which are provided on the one of the two handles, forming lateral sides(s) of the isosceles triangle.

The two handles project from the base plate at a right angle and extend toward the upper surface of the laser housing. This insurers convenient holding of the apparatus and easy lifting to a desired height during the mounting process. One person is able to mount the laser on a tripod, holding and lifting the laser with one hand while screwing in the tripod attachment screw into hole with an inner thread, which is provided in the laser base plate, with the other hand. The servo positioners, which are provided on the handles, permit mounting laser in a position in which the laser is tilted by 90°. The three servo positioners form a three-point support. One of the servo positioners is height adjustable which permits to compensate an unevenness of the base surface. The selected arrangement of the servo positioners, during the height adjustment of the third servo positioner, causes a pivotal movement of the base plate about the handle with the stationary servo positioners. This prevents a sideways tilting of the housing and thereby the need in a new alignment of the rotational axis of the laser beam. The base plate with integrated handles facilitates the mounting of the constructional laser on the tripod in its use position and pivoting the laser by 90° for effecting the vertical laser beam projection. The need for the attachment and detachment of the additional base plate is eliminated.

Because the handles and the base plate are formed as one-piece part, the base plate, together with the handles, can be produced by a cost-effective injection molding process.

Advantageously, the base plate, together with the handles is releasably connected with the housing. Thereby, the base plate can be easily replaced when, e.g., the inner thread in its bottom or the handle(s) is (are) damaged. The screwing of the base plate with the housing is effected from the inside of the housing. Thereby, it is insured that the change of the base plate can be effected only by the authorized personnel.

To reduce weight each handle is formed of a core made of a hard plastic material and surrounded with a jacket formed of a foamed plastic material, with the servo positioner(s) projecting from the core. In addition to the weight reduction, the use of plastic materials facilitate formation of handles with an ergonomic shape, which in turn facilitate handling of the constructional laser during its installation and carrying the laser.

The height adjustable servo positioner has an outer thread which cooperates with an inner thread provided in the core of the respective handle for securing this servo-positioner in the handle. The height adjustment is effected with a knurled wheel with which the servo positioner is screwed into the handle to a greater or lesser degree. This provides for a very simple and cost-effective height adjustment of the servo positioner which height adjustment is necessary for compensating of the unevenness of the base surface. In case it is damaged, the servo positioner can be quickly removed. The height adjustment effected by using cooperating inner and outer threads provides for a simple and precise alignment of a datum plane defined by the three-point positioning.

Advantageously, on a side of the laser housing remote from the handles, there is provided a level indicator which facilitate the control of the horizontal alignment of the housing when the latter rests on the servo positioners.

BRIEF DESCRIPTION OF THE DRAWINGS

The features and objects of the present invention will become more apparent, and the invention itself will be best understood from the following detailed description of the preferred embodiments when read with reference to the accompanying drawings, wherein.

DETAILED DESCRIPTION OF THE PRESENT INVENTION

Figure 1:
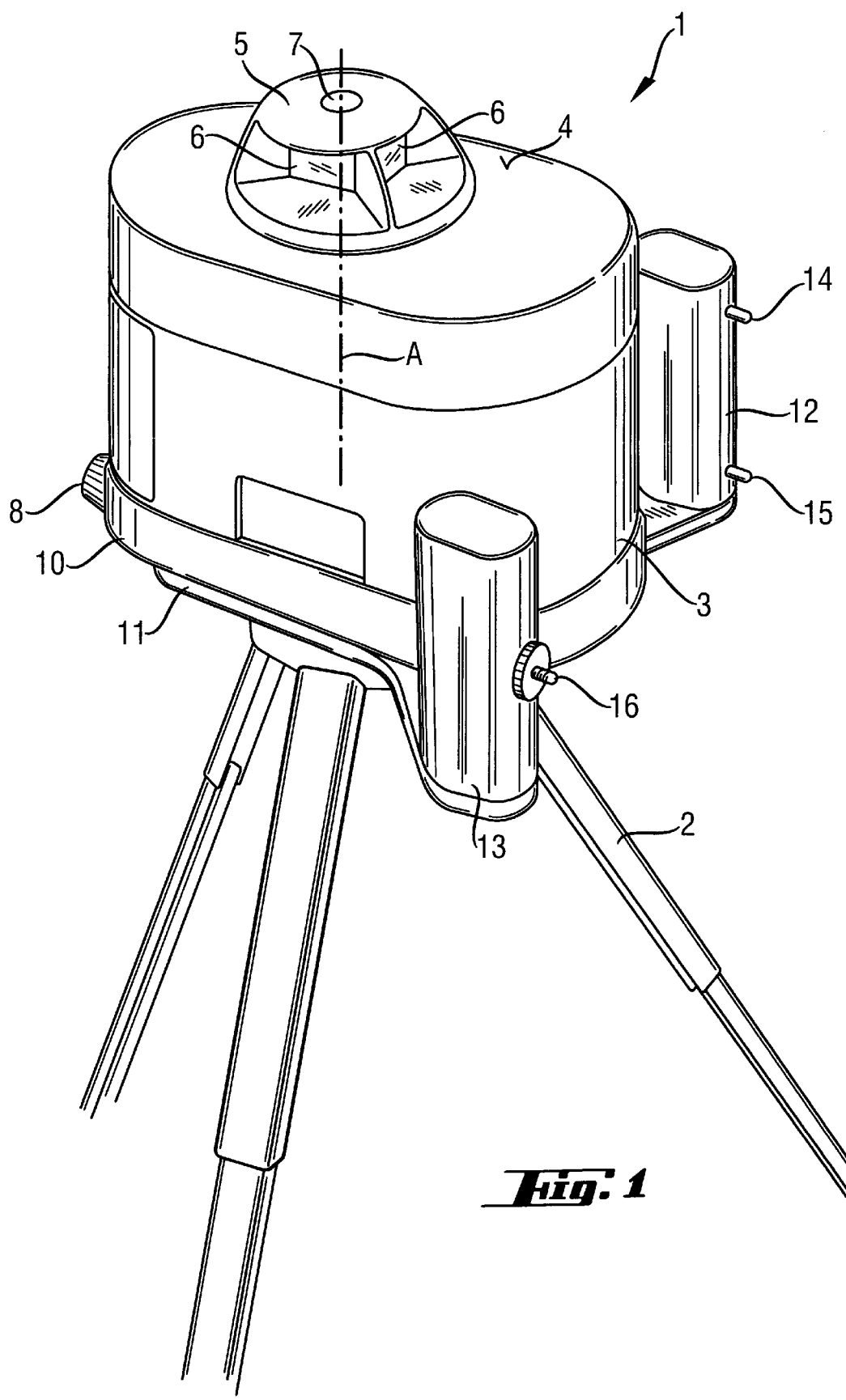
FIG. 1 shows a perspective view of a constructional laser for horizontal projection according to the present invention which is mounted on a tripod.

FIG. 1 shows a constructional laser 1 according to the present invention mounted on a tripod 2 in a position for the projection of horizontal lines or planes. The laser 1 has a housing 3 on the upper surface 4 of which, a projection dome 5 is arranged. The projection dome 5 has a plurality of light beam apertures 6 which are provided on four sides of the projection dome 3 somewhat transverse to the upper surface 4 of the housing 3. A projection aperture 7 is provided in the upper surface of the projection dome 5. Inside of the housing 3, there is provided a laser light source which emits a laser beam in the visible spectrum. The laser beam is emitted in a direction toward the projection dome 5 where an optical device for dividing and deflection of the laser beam is arranged. Advantageously, the optical device includes a semi-transparent prism which divides the laser beam in vertical and horizontal components. The semi-transparent prism rotates about an axis A which extends approximately perpendicular to the upper surface 4 of the housing 3. The vertical component of the laser beam is emitted parallel to the axis A through the projection aperture 7. The horizontal component of the laser beam rotates about the axis A and is emitted through the beam apertures 6 of the projection dome 5. Advantageously, the semi-transparent prism is motor-driven. The alignment of the rotational axis A of the semi-transparent prism is effected with two adjusting screws which insure its displacement along two axis which extend perpendicular to each other and to the axis A. One of the adjusting screws, screw 8, is provided on the front side of the housing 3. The second screw is provided on the side of the housing 3 remote from the observer.

At the bottom 10 of the housing 3, a base plate 11 is provided. The base plate 11 has a docking arrangement, preferably, an inner thread for receiving a fastening or attachment screw provided on the tripod 2. Two handles 12 and 13 project from the base plate 11 at a right angle. The handles 12, 13 extend toward the upper surface 4 of the housing 5. Three pin-shaped servo positioners 14, 15, 16 are provided on the handles 12 and 13. Two of the servo positioners 14 and 15 are provided at opposite longitudinal ends of one of the handles, handle 12. The third servo positioner 16 is provided on the other handle 13 and is height adjustable. The location of the third servo positioner 16 is so selected that the connection lines of the first two servo positioners 14, 15 with the third height-adjustable servo positioner 16 represent lateral sides of an isosceles triangle which is defined by the connection lines of the servo positioners 14, 15, 16.

Figure 2:
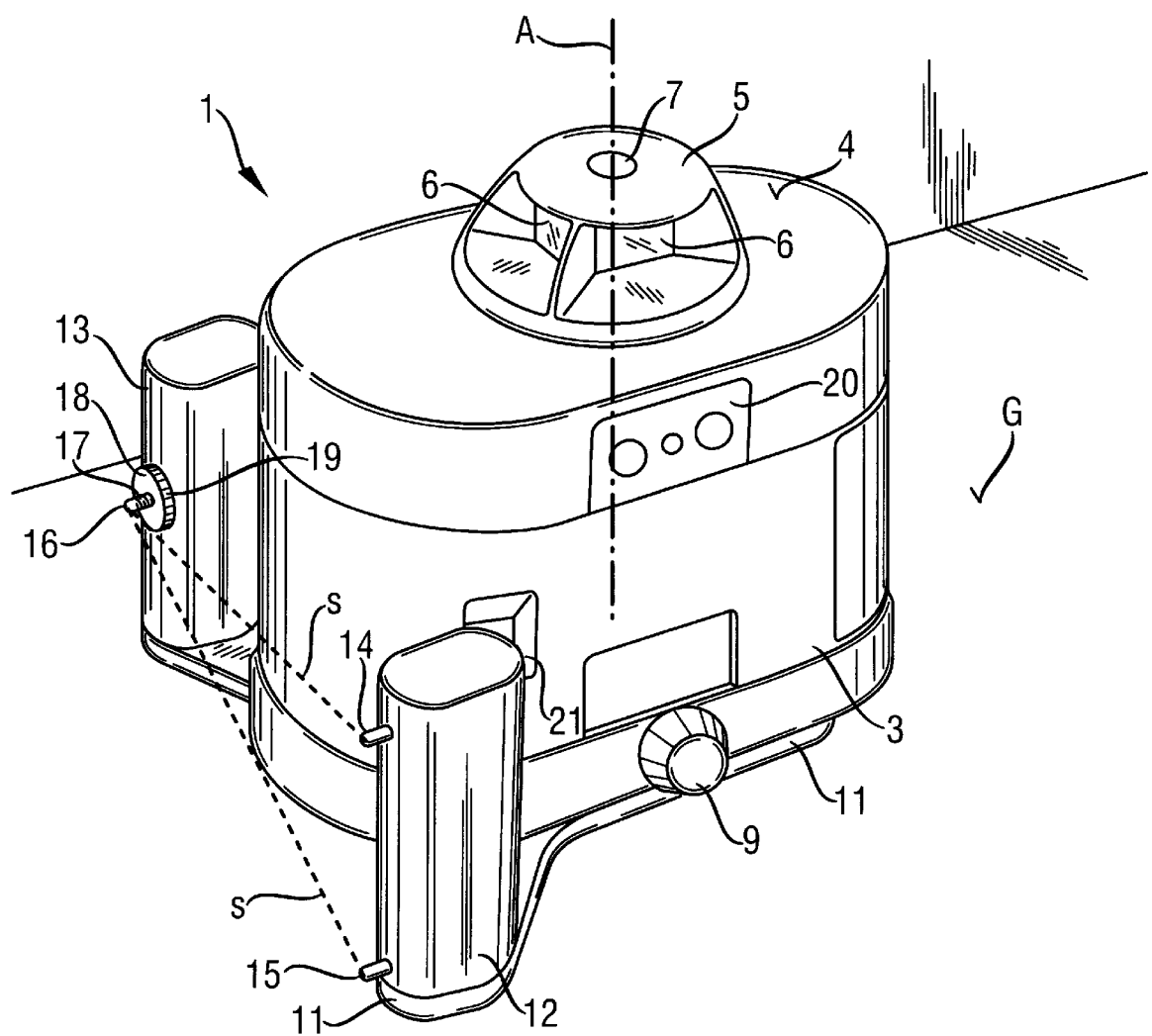
FIG. 2 shows a perspective plan view of a constructional laser according to the present invention.

The lateral sides S of the isosceles triangle defined by the connection lines of the servo positioners 14, 15 16 are shown in FIG. 2 with dash lines. In FIG. 2, the laser 1 is shown in its most common use position, in which the base plate 11 rests on some support, e.g., a base G. At that, the laser is pivoted by 180° relative to the laser position shown in FIG. 1, so that the previously remote from the observer side of the housing 3 becomes visible. Thus, the second adjusting screw 9 for adjusting the axis A of the prism becomes visible. Also becomes visible a control panel 20 with status indicators for controlling the drive of the semi-transparent prism. One can further see a level indicator 21, which is half-hidden by the handle 12 and with which a correct alignment of the rotational axis A can be controlled. As it has already been discussed above, the servo positioners 14, 15 provided on the handle 12 are pin-shaped, and remain stationary. The servo positioner 16, which is provided approximately in the middle of the second handle 13 is, as it has also been discussed previously, is height adjustable. To this end, the servo positioner 16 is provided with an outer thread 17 which cooperates with an inner thread provided in the second handle 13. The height adjustment is effected by screwing the servo positioner 16 into the handle 13 to greater or lesser extent. To facilitate the height adjustment, a set wheel 18 is fixedly connected with the servo positioner 16. The circumferential surface 19 of the set wheel 18 has a knurling provided thereon.

To reduce the weight, the handles 12, 13 are formed of a rigid core, formed of a hard plastic and surrounded with a jacket formed of a foamed plastic material, with the servo positioners 14, 15, 16 being secured in the cores. In addition to the reduction of weight, the use of plastic material facilitate the formation of the handles 12, 13 with an ergonomic shape, which in turn facilitate handling of the constructional laser 1 during the installation.

Figure 3:
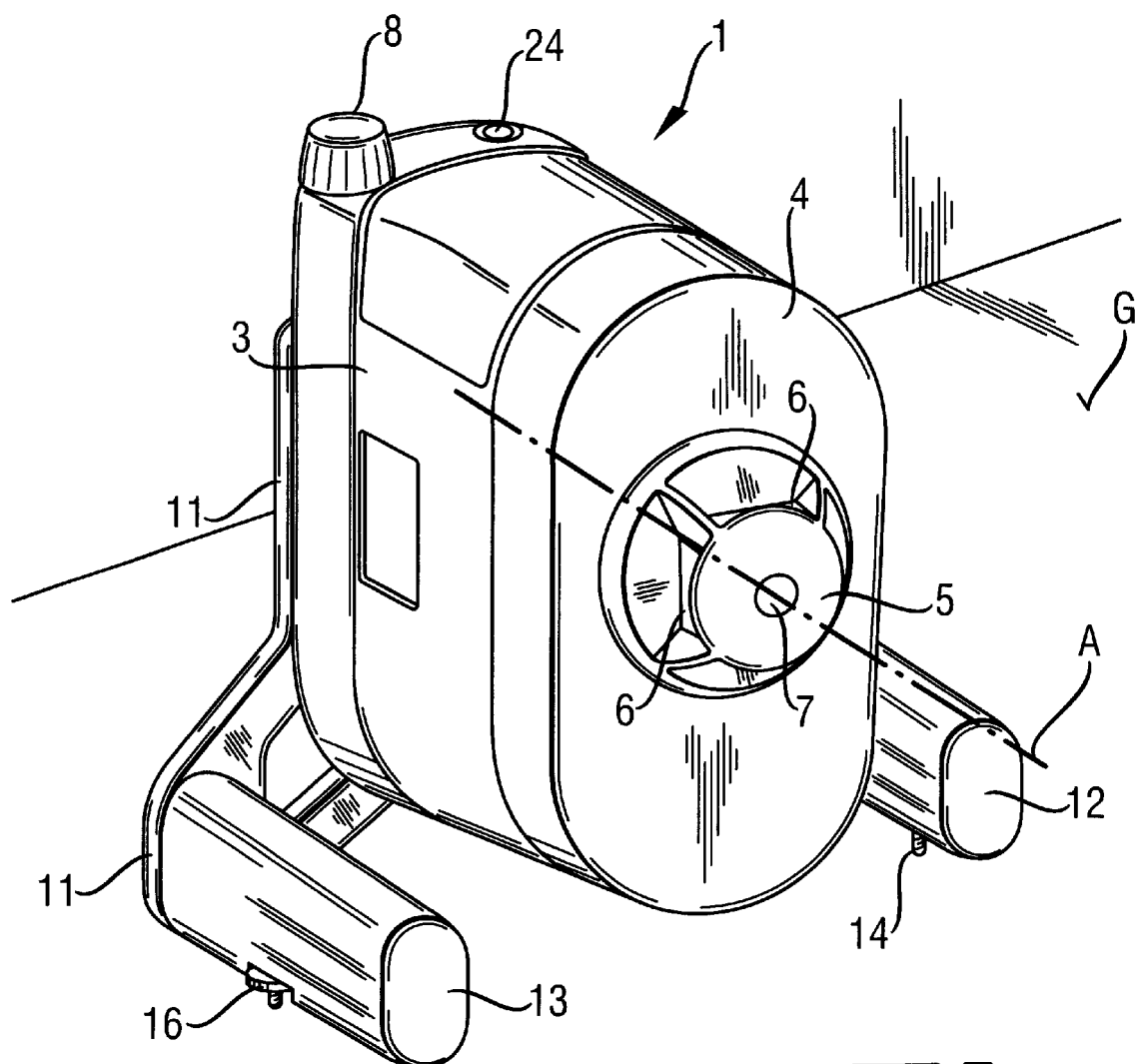
FIG. 3 shows a perspective view of a constructional laser according to the present invention pivoted by 90° for vertical projection.
Figure 4:
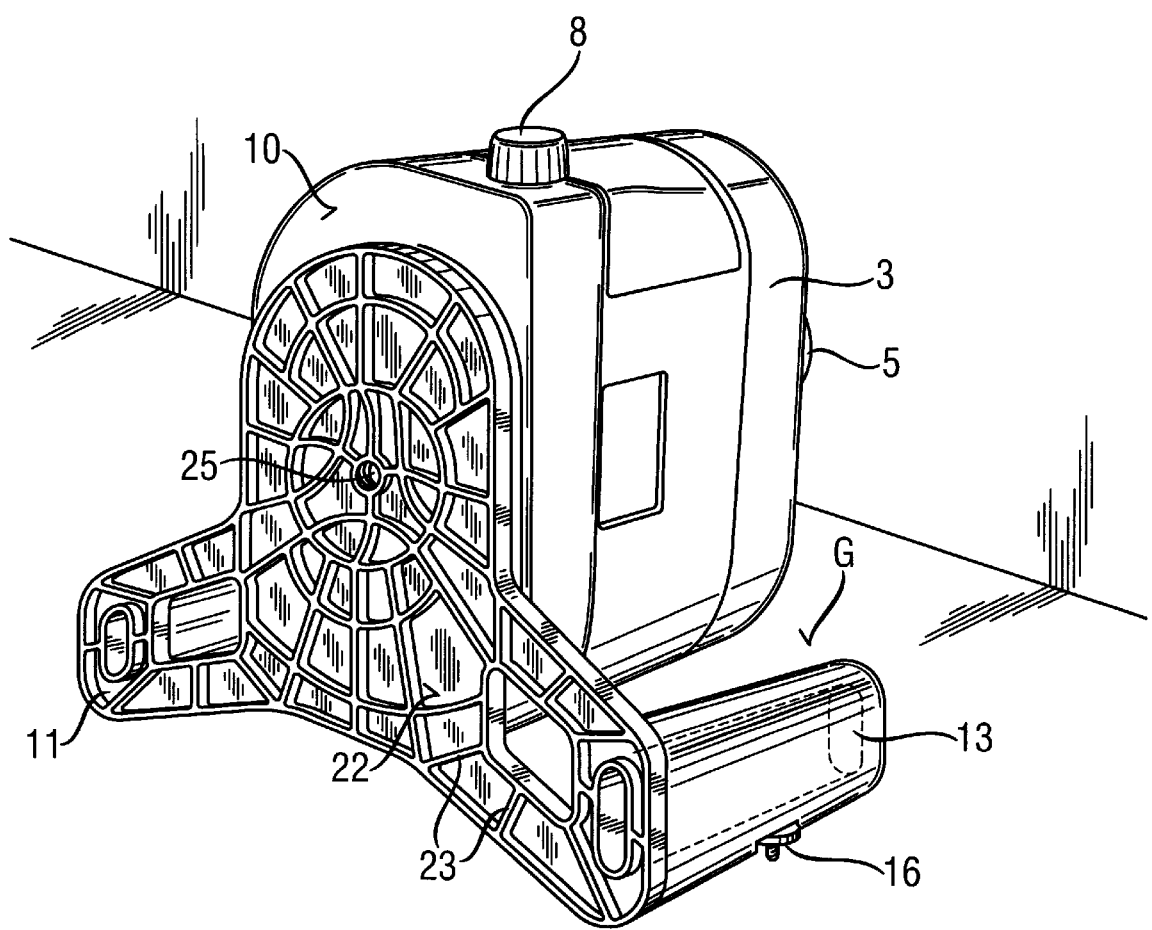
FIG. 4 shows a perspective view of a constructional laser according to the present invention viewed from the bottom.

FIGS. 3 and 4 show the constructional laser 1 in a position offset by 90° with respect to the position of FIGS. 1–2 and which is necessary for projection of vertical lines and planes. The tilted laser 1 rests on the handles 12, 13, which are, as discussed previously, extend transverse to the base plate 11, and is supported on the base "G" by the servo positioners 14, 15, 16 projecting from the handles 12, 13. The compensation of the unevenness of the base G is effected by the height adjustment of the serve positioner 16 provided on the handle 13. A level indicator 24, which is provided on the front side of housing 3, indicates a correct horizontal alignment of the base plate 11. In this position of the laser 1, the upper surface 4 of the housing 3 extends vertically, and the projection dome 5 extends sidewise. In this position, the projection aperture 7 permits an exit of only horizontal component of the laser beam.

The light beam apertures 6 serve for projecting of the rotatable vertical component of the laser beam. The rotational axis A of the rotatable laser beam is aligned parallel to the base G with two adjusting screws. In FIGS. 3 and 4, only the adjusting screw 8 is visible. The second screw is provided on the side of the housing 3 remote from the observer.

FIG. 4 shows the bottom 22 of the base plate 11. The base plate 11 is a separate part and is screwed to the bottom 10 of the housing 3 from the inside of the housing 3. To reduce weight, the base plate 11 is made rather thin. To increase its rigidity, the base plate 11 is provided with stiffening ribs 23. An inner thread 25 in the bottom 22 of the base plate 11, which is provided for receiving the attachment screw of the tripod 2, is clearly visible.

According to the invention, the base plate 11 is provided with integrated handles. The base plate 11, as discussed above, is provided with an inner thread for receiving the tripod attachment screw. The handles 12, 13 provide for convenient lifting and carrying of the laser 1 and serve simultaneously for supporting the laser 1 in its vertical use position, in which the housing rests on a base surface in a position offset by 90° with respect to its normal vertical position. The servo positioners provided on the handles serve for compensating the base surface unevenness. The height adjustment is so effected that a cumbersome adjustment of the rotational axis of the laser beam dividing element is avoided.

Though the present invention was shown and described with reference to the preferred embodiments, various modifications thereof will be apparent to those skilled in the art and, therefore, it is not indented that the invention be limited to the disclosed embodiments or details thereof, and departure can be made therefrom within the spirit an scope of the appended claims.

What is claimed is:

1. A constructional laser, comprising a housing (3) with a light source located inside the housing for emitting a visible laser beam rotatable about a rotational axis; a base plate (11) attached to the housing (3) and provided with an inner thread (25) approximately in a center of the base plate (11); and two handles (12, 13) for lifting and carrying the laser and connected to the base plate (11), the two handles (12, 13) being spaced from opposite sides of the housing (3) and extending at a right angle from the base plate (11) parallel to a height of the housing (3) toward an upper surface (4) of the housing (3), the handles (12, 13) having at sides thereof remote from the housing (3), three servo positioners (14, 15, 16), with two of the servo positioners (14, 15) being provided at opposite longitudinal ends of one (12) of the handles (12, 13) and with a remaining servo positioner, which is height adjustable, being arranged on another one (13) of the handles (12, 13) so that a three-point arrangement of the servo positioners (14, 15, 16) defines an isosceles triangle, connection lines between the remaining servo positioner (16) arranged on the another one (13) of the handles (12, 13) and the two servo positioners (14, 15) provided on the one (12) of the two handles (12, 13), forming lateral side(s) of the isosceles triangle.

2. A constructional laser according to claim 1, wherein the two handles (12, 13) are formed as one-piece part with the base plate (11).

3. A constructional laser according to claim 1, wherein the base plate (11) together with the handles (12, 13) is releasably attached to a bottom (10) of the housing (3).

4. A constructional laser according to claim 1, wherein the handles (12, 13) comprise respective cores which are formed of a hard plastic material and are surrounded with jackets formed of a foamed plastic material, and from which respective servo positioners (14, 15, 16) project.

5. A constructional laser according to claim 4, wherein the remaining servo positioner (16) has an outer thread (17) and is fixedly connected with a knurled wheel (18) for effecting height adjustment of the remaining servo positioner by screwing the remaining servo positioner (16) into the core of the another one handle (13) which is provided with a cooperating inner thread.

6. A constructional laser according to claim 1, wherein the housing (3) comprises, at a side thereof remote from the handles (12, 13), a level indicator (24) for controlling a horizontal alignment of the housing (3) when the housing (3) rests on the servo positioners (14, 15, 16).

\* \* \* \* \*